US007231813B2

(12) United States Patent
Kato et al.

(10) Patent No.: US 7,231,813 B2
(45) Date of Patent: Jun. 19, 2007

(54) LEAK DETECTOR FOR EVAPORATED FUEL

(75) Inventors: Yasuo Kato, Niwa-gun (JP); Masao Kano, Gamagori (JP); Yasunori Kobayashi, Toyohashi (JP); Shinsuke Takakura, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/324,582

(22) Filed: Jan. 4, 2006

(65) Prior Publication Data

US 2006/0150722 A1 Jul. 13, 2006

(30) Foreign Application Priority Data

Jan. 12, 2005 (JP) ............................. 2005-005274
Jul. 4, 2005 (JP) ............................. 2005-194611

(51) Int. Cl.
*G01M 3/28* (2006.01)
*G01M 3/32* (2006.01)

(52) U.S. Cl. ......................... 73/47; 73/40.5 R; 73/49.7

(58) Field of Classification Search .................... 73/40, 73/40.5 R, 46–49.3, 49.7, 118.1
See application file for complete search history.

(56) References Cited

U.S. PATENT DOCUMENTS 5,890,474 A * 4/1999 Schnaibel et al. .......... 123/520
6,161,423 A * 12/2000 Okuma ...................... 73/118.1
6,474,148 B2 * 11/2002 Takagi et al. ............. 73/118.1
6,698,280 B1 * 3/2004 Iden et al. ................. 73/118.1
6,701,777 B2 * 3/2004 Yamaguchi et al. ......... 73/49.7
6,993,957 B2 * 8/2005 Kano et al. .................. 73/49.7
6,988,396 B2 * 1/2006 Matsubara et al. ........ 73/118.1
2004/0000187 A1 1/2004 Kobayashi et al.
2004/0089064 A1 * 5/2004 Kidokoro et al. .......... 73/118.1

* cited by examiner

*Primary Examiner*—Hezron Williams
*Assistant Examiner*—David A. Rogers
(74) *Attorney, Agent, or Firm*—Nixon & Vanderhye PC

(57) ABSTRACT

An evaporated fuel leak detector detects leakage of an evaporated fuel generated in a fuel tank. The detector includes: a differential pressure valve, a pump for sucking a detection port side to reduce pressure on a fuel tank side, and pressure detection means for detecting pressure on a detection port side. The valve includes a detection port connecting to a fuel tank side, an atmosphere port opened to atmosphere, a pressure chamber and a valve member displaceable in accordance with differential pressure between the detection port and the pressure chamber for connecting and disconnecting a connection between the detection port and the atmosphere port. The valve member disconnects between the detection port and the atmosphere port in a case where pressure of the pressure chamber becomes larger than pressure of the detection port by a predetermined pressure.

10 Claims, 10 Drawing Sheets

LEAK DETECTOR FOR EVAPORATED FUEL

CROSS REFERENCE TO RELATED APPLICATIONS

A leak detector for evaporated fuel detects leakage of the evaporated fuel generated in a fuel tank. This detector is disclosed in, for example, US Patent Application Publication No. 2004/0000187-A1. In this detector, the evaporated fuel is adsorbed by an adsorbent such as granular activated carbon in an adsorption chamber. The adsorbed evaporated fuel is discharged to an intake pipe side by negative pressure in an evaporated fuel processing system. The detector detects leakage of the evaporated fuel processing system.

FIELD OF THE INVENTION

The present invention relates to a leak detector for evaporated fuel.

BACKGROUND OF THE INVENTION

A leak detector for evaporated fuel detects leakage of the evaporated fuel generated in a fuel tank. This detector is disclosed in, for example, US Patent Application Publication No. 2004/0000187-A1. In this detector, the evaporated fuel is adsorbed to adsorbent such as granular activated carbon in an adsorption chamber. The adsorbed evaporated fuel is discharged to an intake pipe side by negative pressure in an evaporated fuel processing system. The detector detects leakage of the evaporated fuel processing system.

The pressure in the evaporated fuel processing system disposed on a fuel tank side is pressurized or depressurized by a pump so that the leakage of the evaporated fuel is detected. A passage among an atmosphere side, the fuel tank side and a pump side is switched in accordance with operation and stop of the pump by an electromagnetic valve.

However, the leakage detection of the evaporated fuel is performed when the engine of an automotive vehicle is stopped. In this case, electricity is not supplied from a generator to a battery in the vehicle. Therefore, the leakage detection is not sufficiently performed when sufficient electricity is not supplied to the electromagnetic valve since the battery is deteriorated or the electricity supply performance of the battery is reduced in case of low temperature. Further, since the electromagnetic valve is composed of a core, a coil and the like, the weight and dimensions of the leak detector become larger. Thus, it is required to reduce electricity consumption of the leak detector and to reduce the weight and the dimensions of the leak detector.

SUMMARY OF THE INVENTION

In view of the above-described problem, it is an object of the present invention to provide a leak detector for evaporated fuel.

An evaporated fuel leak detector for detecting leakage of an evaporated fuel generated in a fuel tank includes: a differential pressure valve including a detection port, an atmosphere port, a pressure chamber and a valve member, wherein the detection port connects to a fuel tank side, wherein the atmosphere port is opened to atmosphere, wherein the valve member is displaceable in accordance with the differential pressure between the detection port and the pressure chamber for connecting and disconnecting a connection between the detection port and the atmosphere port, and wherein the valve member disconnects between the detection port and the atmosphere port in a case where pressure of the pressure chamber becomes larger than pressure of the detection port by a predetermined pressure; a pump for sucking a detection port side of the differential pressure valve so as to reduce pressure on a fuel tank side; and pressure detection means for detecting pressure on a detection port side of the differential pressure valve.

In the above detector, since the mechanical differential pressure valve connects and disconnects between the detection port and the atmosphere port by using the differential pressure between the detection port and the pressure chamber, the electric power consumption of the detector is lower than that of a detector having an electromagnetic valve for connecting and disconnecting between the detection port and the atmospheric port. Further, the mechanical differential pressure valve has simple construction and light weight, compared with the detector having the electromagnetic valve. Thus, the total weight of the detector is reduced.

Alternatively, the detector may further include a motor for driving the pump. The pump includes a first inlet/outlet port connecting to the detection port and a second inlet/outlet port connecting to the pressure chamber. The pump switches between a state for sucking from the first inlet/outlet port and for discharging to the second inlet/outlet port and another state for sucking from the second inlet/outlet port and for discharging to the first inlet/outlet port so that the valve member is displaced. The motor is capable of switching a rotation direction of backward and forward so that the pump switches between the state for sucking from the first inlet/outlet port and for discharging to the second inlet/outlet port and the other state for sucking from the second inlet/outlet port and for discharging to the first inlet/outlet port. When the motor rotates in a forward direction so that the pump sucks from the second inlet/outlet port and discharges to the first inlet/outlet port, the pump sucks air from the pressure chamber through the second inlet/outlet port so that the valve member connects between the detection port and the atmosphere port, and the pump discharges the air to the atmosphere through the first inlet/outlet port, the detection port and the atmosphere port. When the motor rotates in a backward direction so that the pump sucks from the first inlet/outlet port and discharges to the second inlet/outlet port, the pump sucks from the fuel tank side through the first inlet/outlet port, and the pump discharges the air to the pressure chamber through the first inlet/outlet port.

Alternatively, the detector may further include: a reference orifice for measuring leakage reference pressure; and a check valve. The second inlet/outlet port further connects to the atmosphere through the check valve and the reference orifice. The check valve allows to flow from the reference orifice to the second inlet/outlet port, and prohibits to flow from the second inlet/outlet port to the reference orifice. The pressure detection means further detects pressure on a second inlet/outlet port side of the reference orifice. When the motor rotates in a forward direction so that the pump sucks from the second inlet/outlet port and discharges to the first inlet/outlet port, the pump sucks the air not only from the pressure chamber through the second inlet/outlet port but also from the atmosphere through the second inlet/outlet port, the check valve and the reference orifice. When the motor rotates in a backward direction so that the pump sucks from the first inlet/outlet port and discharges to the second inlet/outlet port, the pump sucks the air from the fuel tank side through the first inlet/outlet port.

Alternatively, the detector may further include an electric control unit. The pressure detection means is a differential pressure sensor for detecting differential pressure between a second inlet/outlet port side of the reference orifice and the detection port side of the differential pressure valve. When the motor rotates in the forward direction, the pressure detection means detects a differential pressure as a leakage reference differential pressure. When the motor rotates in the backward direction, the pressure detection means detects a differential pressure as a leakage differential pressure. The electric control unit determines that leakage of the fuel tank side is smaller than leakage from the reference orifice in a case where the leakage reference differential pressure is smaller than the leakage differential pressure. The electric control unit determines that leakage of the fuel tank side is larger than leakage from the reference orifice in a case where the leakage reference differential pressure is larger than the leakage differential pressure.

Alternatively, the detector may further include an electric control unit. The pressure detection means is a pair of absolute pressure sensors, one of which is disposed on a second inlet/outlet port side of the reference orifice, and the other one of which is disposed on a detection port side of the differential pressure valve. When the motor rotates in the forward direction, the pressure detection means detects a difference of pressure between the second inlet/outlet port side of the reference orifice and the detection port side of the differential pressure valve as a leakage reference differential pressure. When the motor rotates in the backward direction, the pressure detection means detects a difference of pressure between the second inlet/outlet port side of the reference orifice and the detection port side of the differential pressure valve as a leakage differential pressure. The electric control unit determines that leakage of the fuel tank side is smaller than leakage from the reference orifice in a case where the leakage reference differential pressure is smaller than the leakage differential pressure. The electric control unit determines that leakage of the fuel tank side is larger than leakage from the reference orifice in a case where the leakage reference differential pressure is larger than the leakage differential pressure.

Further, an evaporated fuel leak detector for detecting leakage of an evaporated fuel generated in a fuel tank includes: a differential pressure valve including a detection port, a tank port connecting to a fuel tank side, an atmosphere port opened to atmosphere, a pressure chamber and a valve member displaceable in accordance with differential pressure between the detection port and the pressure chamber for switching a connection between the detection port and the tank port and a connection between the atmosphere port and the tank port; a pump including an intake port; an electromagnetic valve for switching a connection between the intake port of the pump and the pressure chamber and a connection between the intake port of the pump and the detection port; and pressure detection means for detecting pressure between the intake port of the pump and the detection port.

In the above detector, since the mechanical differential pressure valve switches a connection between the detection port and the tank port and a connection between the atmosphere port and the tank port, the electric power consumption of the detector becomes lower, compared with the detector having the electromagnetic valve. Further, the mechanical differential pressure valve has simple construction and light weight, compared with the detector having the electromagnetic valve. Thus, the total weight of the detector is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
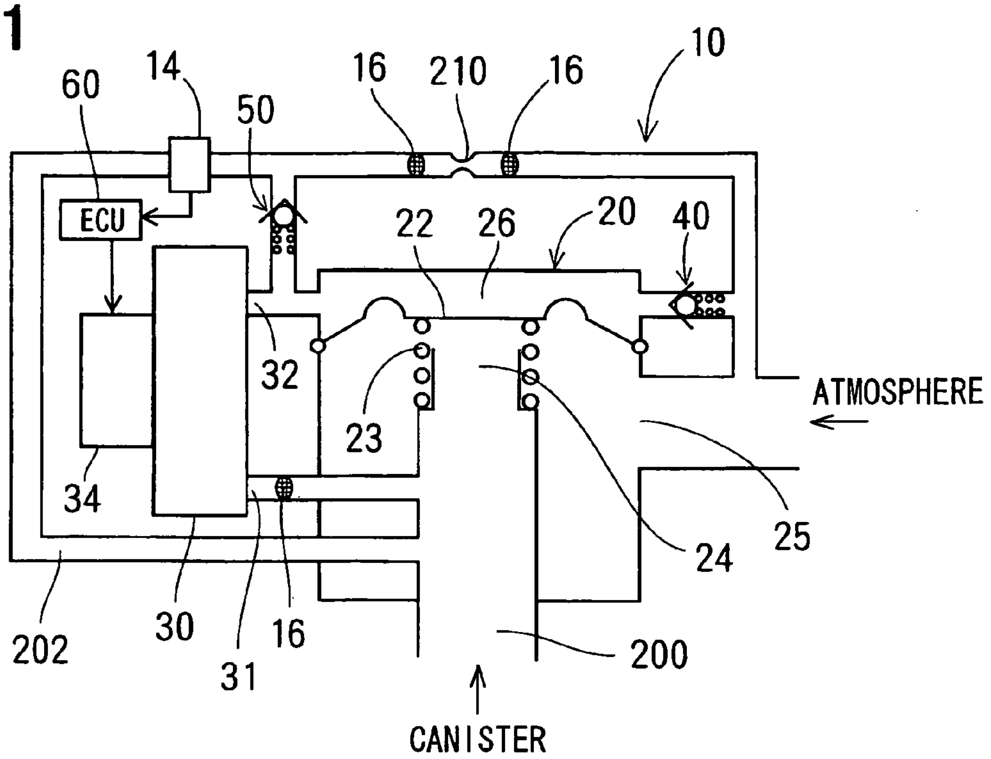
FIG. 1 is a schematic view showing an evaporated fuel leak detector according to a first embodiment of the present invention.
Figure 2:
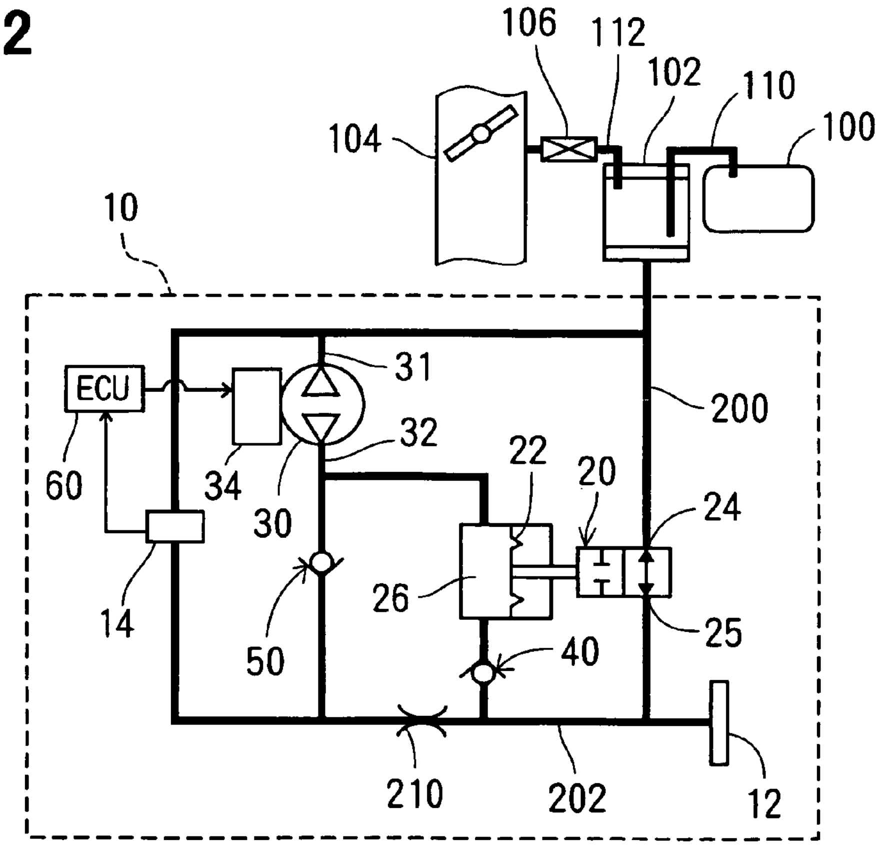
FIG. 2 is a schematic view showing an evaporated fuel processing system, leakage of which is detected with the detector according to the first embodiment.

FIG. 1 shows an evaporated fuel leak detector 10 according to a first embodiment of the present invention. FIG. 2 shows an example of the evaporated fuel leak detector attached to an evaporated fuel processing system so that the detector detects leakage of the system.

In the processing system, an evaporated fuel generated in a fuel tank 100 is adsorbed by an adsorbent such as granular activated carbon in a canister 102 as an adsorption chamber. The adsorbed evaporated fuel is discharged to an intake pipe 104 by using negative pressure in the intake pipe 104. The fuel tank 100 and the canister 102 are connected with a passage 110. Another passage 112 connects between the canister 102 and the intake pipe 104. The canister 102 is connected and disconnected to an atmosphere side in accordance with a switching state of the leak detector 10. When a purge valve 106 disposed in the passage 112 is opened in the case where an engine of an automotive vehicle runs, the evaporated fuel adsorbed in the canister 102 is discharged to the intake pipe 104 by using the negative pressure in the intake pipe 104.

As shown in FIG. 1, the leak detector 10 includes a filter 12, a differential pressure sensor 14, a differential pressure valve 20, a pump 30, a motor 34, check valves 40, 50, a ECU 60 and a reference orifice 210. The filter 12 filters foreign particles in the atmosphere sucked from the atmosphere side.

A canister passage 200 connecting between the canister 102 and the detector 10 is connected and disconnected to the atmosphere side with the differential pressure valve 20. When the engine runs, the canister passage 200 is connected to the atmosphere side. The canister 200 and the atmosphere side are connected with another pressure detection passage 202 without passing through the differential pressure valve 20. The differential pressure sensor 14 as pressure detection means is disposed in the pressure detection passage 202.

As shown in FIG. 1, the differential pressure valve 20 includes a diaphragm 22, a spring 23, a canister port 24 as a detection port, an atmosphere port 25 and a pressure chamber 26. The spring 23 displaces the diaphragm 22 to separate the diaphragm 22 from the canister port 24, i.e., to connect between the canister port 24 and the atmosphere port 25. The diaphragm 22 divides the canister port 24 from the pressure chamber 26 so that the diaphragm 22 is displaced in accordance with differential pressure between the canister port 24 and the pressure chamber 26. The differential pressure valve 20 connects and disconnects between the canister port 24 and the atmosphere port 25 by displacing the diaphragm 22. The canister port 24 is connected to a canister side, and the atmosphere port 25 is opened to the outside, i.e., the atmosphere. The pressure chamber 26 is connected to the second inlet/outlet port 32 of the pump 30. Further, the pressure chamber 26 is connected to the atmosphere side through the check valve 40. The check valve 40 prevents the air from flowing into the pressure chamber from the atmospheres side.

The first inlet/outlet port 31 of the pump 30 is connected to the canister port 24 through the filter 16. The second inlet/outlet port 32 connects to the pressure chamber 26. The second inlet/outlet port 32 connects to the pressure detection passage 202 through the check valve 50. The pressure detection passage 202 is disposed between the differential pressure sensor 14 and the reference orifice 210. The check valve 50 prevents the air from flowing from the second inlet/outlet port 32 to a reference orifice side. The ECU 60 as control means inputs a pressure signal detected from the differential pressure sensor 14, and determines a rotation direction by driving the motor 34.

The reference orifice 210 is formed for detecting pressure on an evaporated fuel processing system side, which is substantially approached to a certain value when the evaporated fuel processing system is depressurized through the canister passage 200 by the pump 30 in a case where a hole having a passage area (i.e., a cross section) equal to the reference orifice 210 is opened in the evaporated fuel processing system. The diameter of the reference orifice 210 is, for example, 0.5 mm. The filter 16 is disposed on both sides of the reference orifice 210.

Next, operation of the evaporated fuel leak detector 10 is explained.

(1) Normal Step

The normal step is performed in a case where the engine runs. When the engine runs normally, electricity is not supplied to the motor 34. The differential pressure valve 20 is in a state shown in FIGS. 1 and 2. Electricity is not supplied to the purge valve 106 so that the purge valve 106 is closed. Accordingly, the canister side as a fuel tank side is connected to the atmosphere side through the differential pressure valve 20. Further, the canister 102, i.e., the inside of the canister 102, is disconnected to the intake pipe 104. As a result, the evaporated fuel generated in the fuel tank 100 is adsorbed to the canister 102 through the passage 110.

When the purge valve 106 is opened in a case where the system is in the state shown in FIGS. 1 and 2, the intake pipe side of the canister 102 is connected to the atmosphere side through the passage 112, the canister passage 200 and the differential pressure valve 20. Thus, the evaporated fuel adsorbed in the canister 102 is discharged to the intake pipe 104 by using the negative pressure in the intake pipe 104.

(2) Detecting Step for Detecting Leakage Reference Differential Pressure

Figure 3:
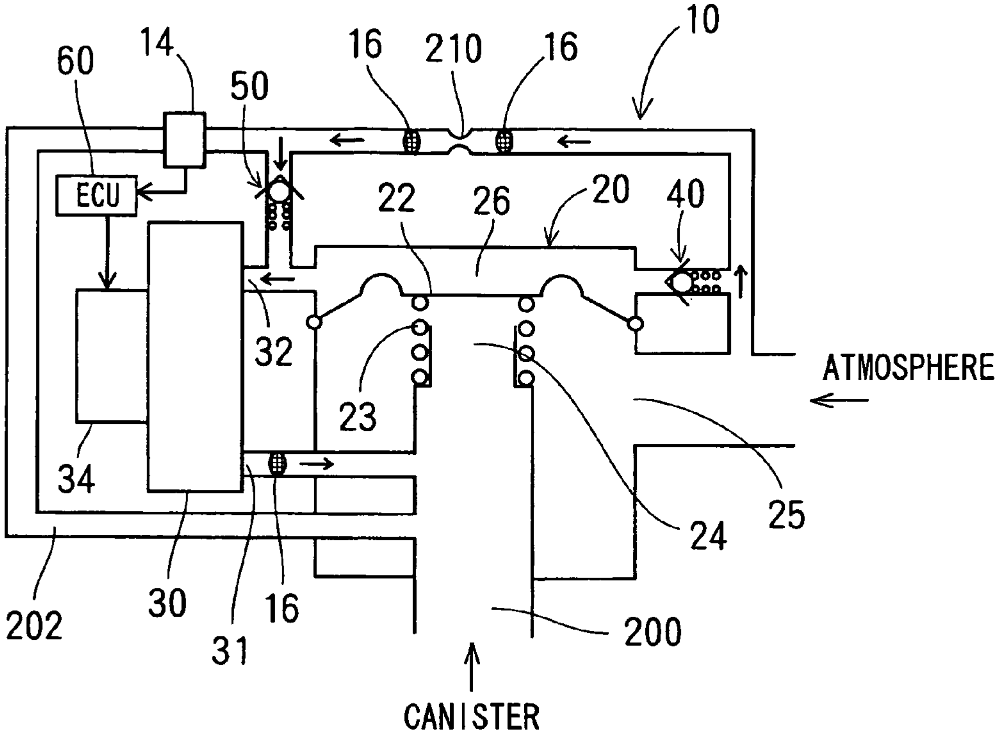
FIG. 3 is a schematic view of the detector explaining a step of detecting a leakage reference differential pressure, according to the first embodiment.

This detecting step is performed in a case where the engine stops. When the leakage reference differential pressure is detected by using the reference orifice 210, the ECU 60 operates the motor 34 to drive in a positive rotation. Energization to the purge valve 106 is stopped so that the purge valve 106 is closed. As shown in FIG. 3, when the motor 34 rotates in the positive rotation, the pump 30 sucks from the second inlet/outlet port 32 and discharges to the first inlet/outlet port 31. As a result, the pressure chamber 26 is depressurized, so that the check valve 40 is closed, and the other check valve 50 is opened. Then, only the air passing through the reference orifice 210 is sucked from the second inlet/outlet port 32. Therefore, the pressure in the pressure detection passage 202 between the reference orifice 210 and the differential pressure sensor 14, i.e., the pressure on the second inlet/outlet port side of the reference orifice 210, is reduced. This state of the system is shown in FIG. 3, wherein the state is equal to a state of the system having a hole in the evaporated fuel processing system, the cross section of the hole being equal to the reference orifice 210.

Further, the differential pressure valve 20 is opened, since the pressure chamber 26 is depressurized. Thus, the air to be discharged from the first inlet/outlet port 31 is discharged to the atmosphere side through the canister 24 and the atmosphere port 25. Accordingly, the canister port side of the differential pressure sensor 14 becomes atmospheric pressure.

The differential pressure sensor 14 detects the differential pressure between the pressure of the second inlet/outlet port side of the reference orifice 210 and the atmospheric pressure on the canister port side of the differential pressure valve 20. Here, the second inlet/outlet port side of the reference orifice 210 is sucked by the pump 30, and the canister port side of the differential pressure valve 20 is discharged by the pump 30. Further, the differential pressure sensor 14 outputs the pressure signal corresponding to the differential pressure to the ECU 60. On the basis of the pressure signal outputted from the differential pressure sensor 14, the ECU 60 calculates and memorizes the differential pressure as the leakage reference differential pressure when the air is sucked through the reference orifice 210. The pressure signal outputted from the differential pressure sensor 14 in the step of detecting the leakage reference differential pressure corresponds to the pressure signal outputted from the differential pressure sensor 14 when the leakage is detected by sucking the air on the evaporated fuel processing system side from the pump 30 in a case where the hole having the same cross section as the reference orifice 210 is opened in the evaporated fuel processing system.

(3) Detecting Step for Detecting Leakage Differential Pressure

Figure 4:
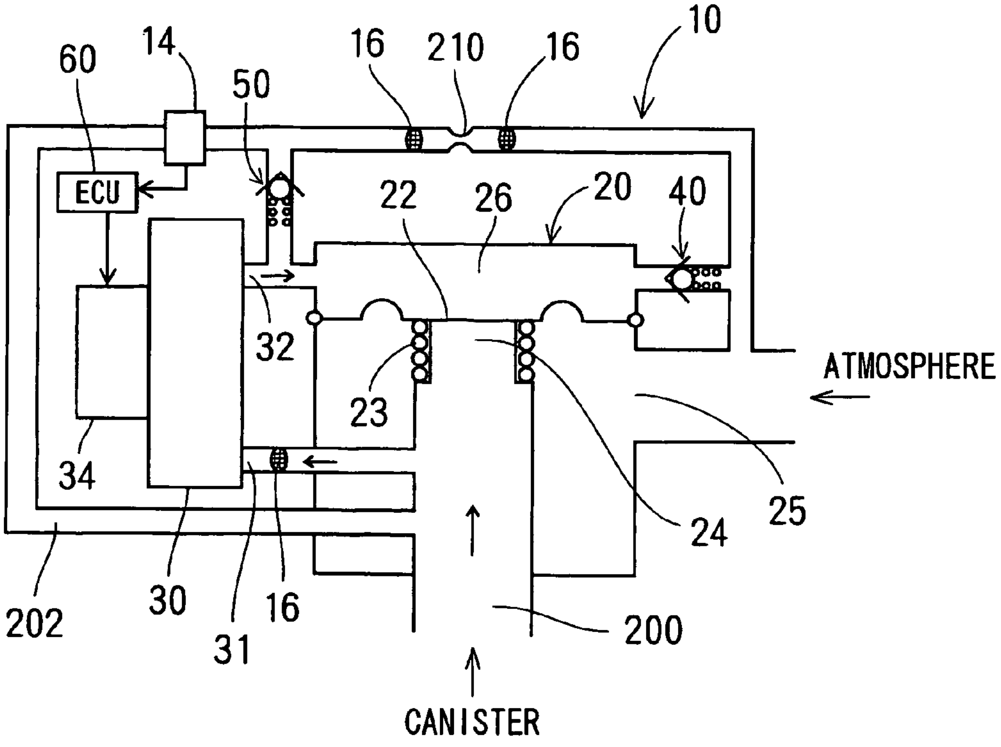
FIG. 4 is a schematic view of the detector explaining a step of detecting a leakage differential pressure, according to the first embodiment.

This detecting step is performed in a case where the engine stops. When the leakage differential pressure in the evaporated fuel processing system is detected, the ECU 60 operates the motor 34 to rotate in a negative rotation. The purge valve 106 is closed. Thus, as shown in FIG. 4, the pump 30 sucks from the first inlet/outlet port 31, and discharges to the second inlet/outlet port 32. As a result, the check valve 50 is closed, and the other check valve is also closed until the pressure chamber 26 becomes an opening valve pressure of the check valve 40. Therefore, the pressure in the pressure chamber 26 is increased. Then, when the pressure in the canister port 24 is reduced under a predetermined pressure, which is determined comparatively to the pressure in the pressure chamber 26, the diaphragm 22 is displaced to the canister port side against the spring force of the spring 23. Thus, the canister port 24 is disconnected from the atmosphere port 25. In this case, the pump 30 sucks from the first inlet/outlet port 31 so that the evaporated fuel processing system side is depressurized. The pressure on the evaporated fuel processing system side, which reaches a certain pressure by depressurizing with the pump 30 sucking from the first inlet/outlet port 31, becomes higher in a case where the leakage from the hole opened in the system is large. The pressure in the evaporated fuel processing system side becomes lower in a case where the leakage from the hole is small.

Since the check valve 50 is closed, the pressure between the reference orifice 210 and the differential pressure sensor 14, i.e., the pressure on the second inlet/outlet port side of the reference orifice 210, becomes the atmospheric pressure. The differential pressure sensor 14 detects the differential pressure between the pressure on the evaporated fuel processing system side and the atmospheric pressure on the second inlet/outlet port side of the reference orifice 210. The pressure on the evaporated fuel processing system side is the pressure on the canister port side, the air of which is sucked by the pump 30. Further, the differential pressure sensor 14 outputs the pressure signal corresponding to the differential pressure to the ECU 60.

The ECU 60 compares between the leakage reference differential pressure detected in the step for detecting leakage reference differential pressure and the leakage differential pressure detected in the step for detecting leakage differential pressure. When the leakage differential pressure is larger than the leakage reference differential pressure, the depressurized pressure on the system side in the step of detecting leakage differential pressure is lower than the depressurized pressure on the second inlet/outlet port side of the reference orifice 210 in the step of detecting leakage reference differential pressure. Specifically, the leakage on the system side is smaller than the reference leakage from the reference orifice 210. On the other hand, when the leakage differential pressure is smaller than the leakage reference differential pressure, the depressurized pressure on the system side in the step of detecting leakage differential pressure is higher than the depressurized pressure on the second inlet/outlet port side of the reference orifice 210 in the step of detecting leakage reference differential pressure. Specifically, the leakage on the system side is larger than the reference leakage from the reference orifice 210.

Thus, by comparing between the differential pressure in the step of detecting the leakage reference differential pressure in a case where the hole having the same cross sectional area as the reference orifice 210 is opened and the differential pressure in the step of detecting the leakage differential pressure, the ECU 60 determines whether leakage exists in the evaporated fuel processing system or not, and estimates the dimensions of the leakage in the system in a case where the leakage exists in the system.

In the system, since only one differential sensor 14 can detect the leakage reference differential pressure and the leakage differential pressure, the number of the parts in the system, i.e., the number of the parts in the detector 10 is reduced.

Second and Third Embodiments

Figure 5:
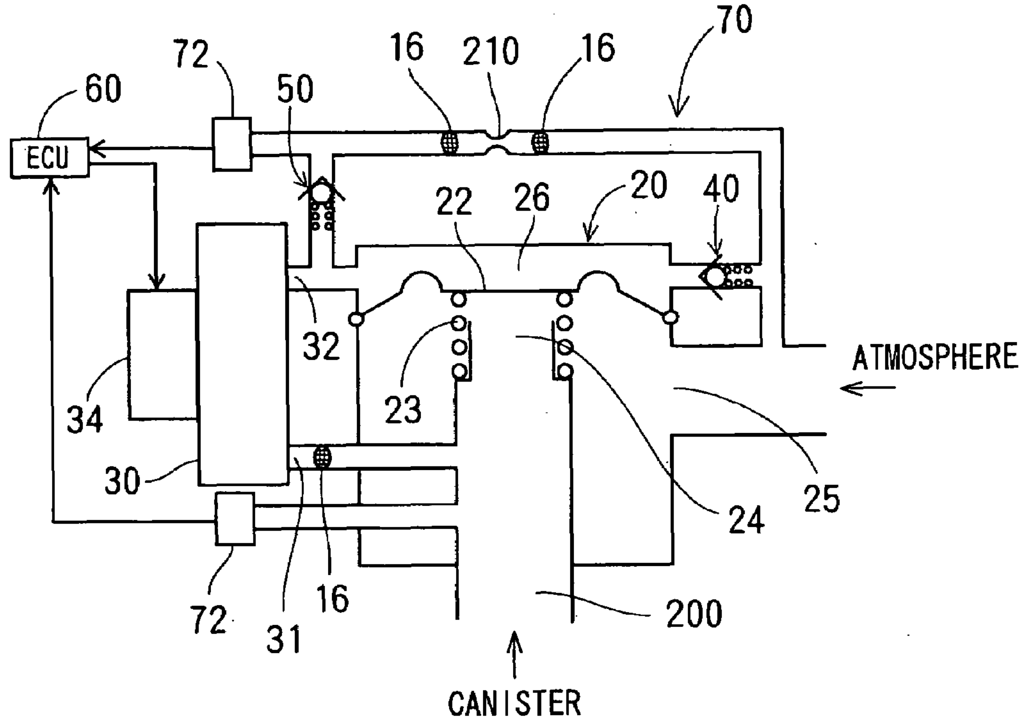
FIG. 5 is a schematic view showing an evaporated fuel leak detector according to a second embodiment of the present invention.
Figure 6:
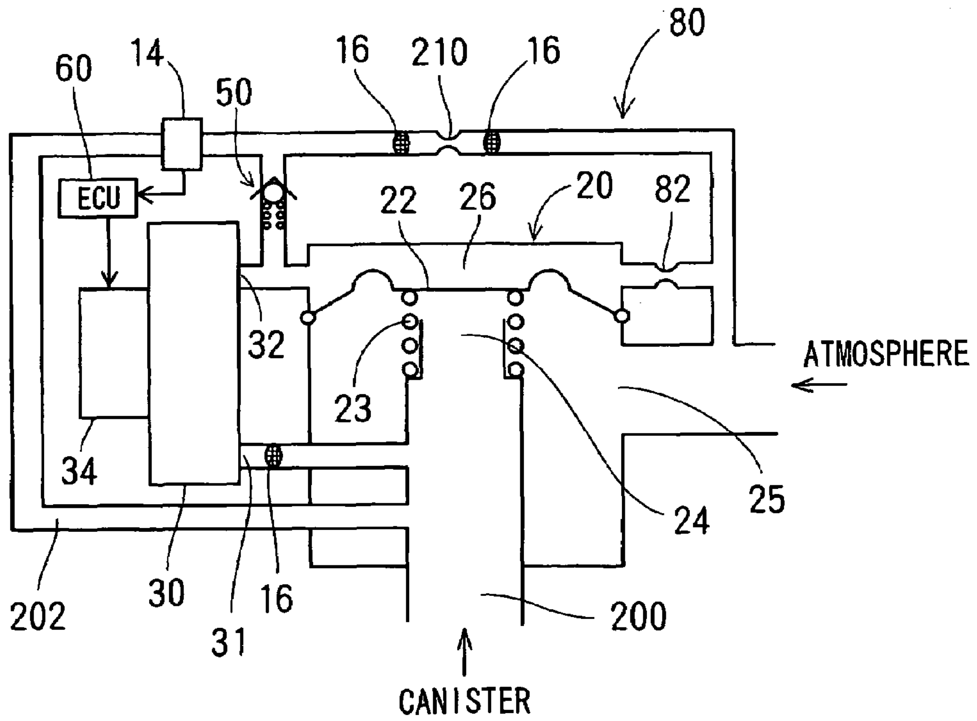
FIG. 6 is a schematic view showing an evaporated fuel leak detector according to a third embodiment of the present invention.
Figure 7A:
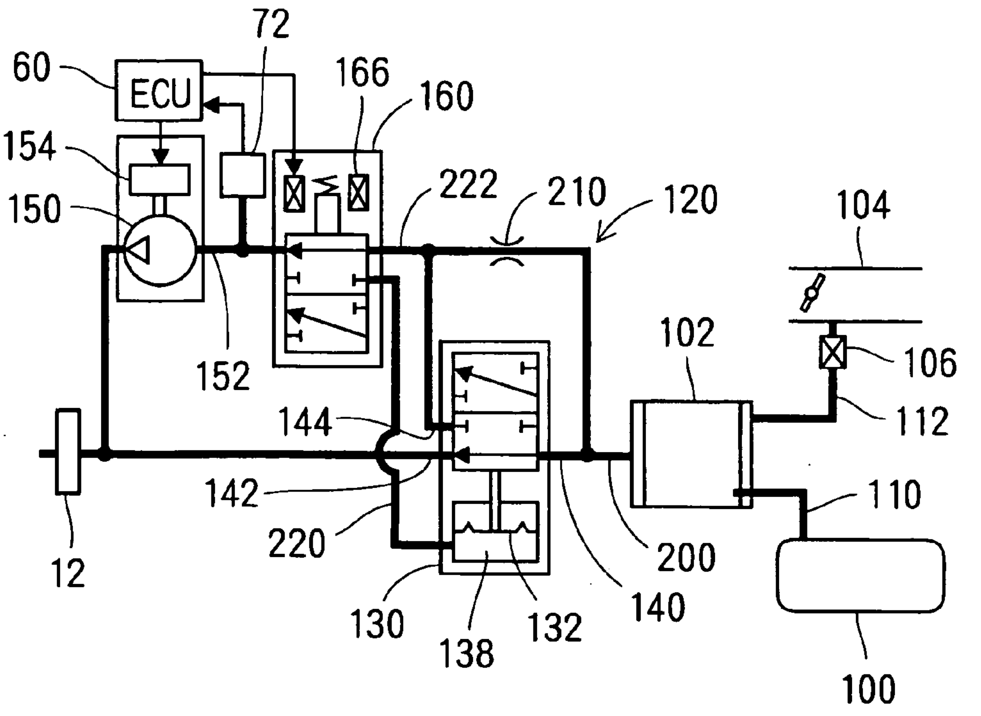
FIG. 7A is a schematic view showing an evaporated fuel processing system, leakage of which is detected with an evaporated fuel leak detector according to a fourth embodiment of the present invention.
Figure 7B:
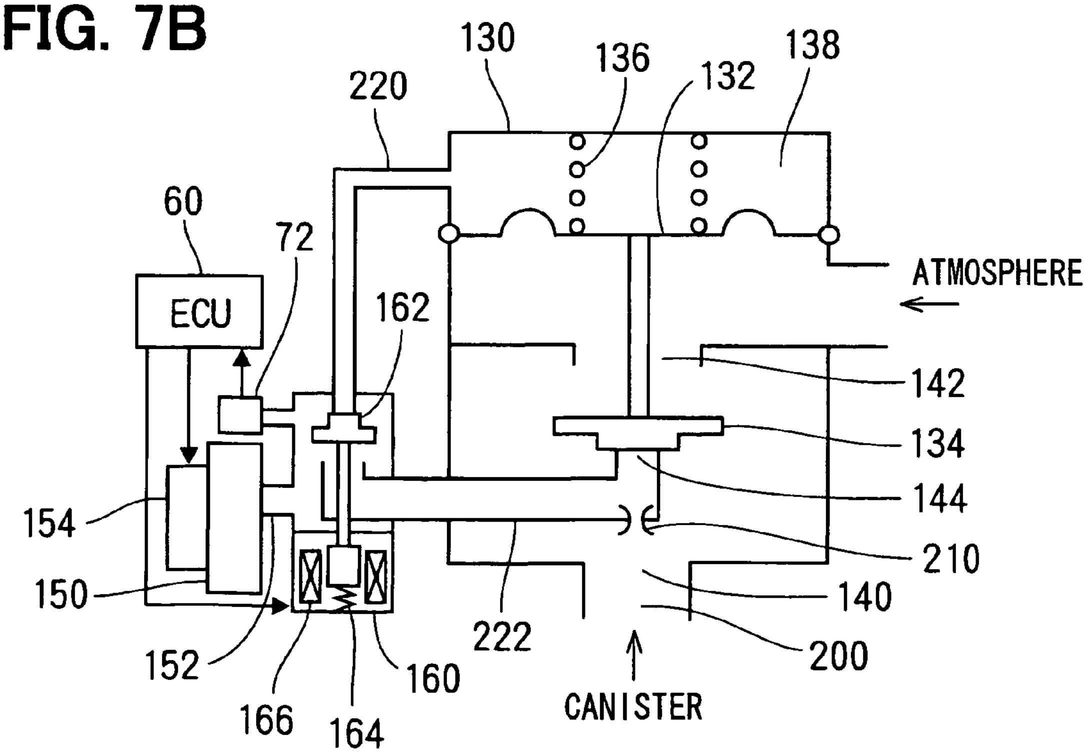
FIG. 7B is a schematic view showing the evaporated fuel leak detector according to the fourth embodiment.

FIG. 5 shows a leak detector 70 according to a second embodiment of the present invention, and FIG. 6 shows a leak detector 80 according to a third embodiment of the present invention.

The detector 70 includes two absolute pressure sensors 72 instead of the differential pressure sensor 14 shown in FIG. 1. Each absolute pressure sensor 72 has a vacuum back-pressure chamber. The absolute pressure sensor 72 as pressure detecting means detects the absolute pressure on the second inlet/outlet port side of the reference orifice 210 and the absolute pressure on the canister port side of the differential pressure valve 20, i.e., the absolute pressure on the evaporated fuel processing system side.

When energization to the motor 34 is cut in the state of the system shown in FIG. 5, the pressure between the reference orifice 210 and the absolute pressure sensor 72 is opened to the atmospheric pressure. By detecting the pressure between the reference orifice 210 and the absolute pressure sensor 72, the atmospheric pressure in a position of the system can be detected accurately without depending on altitude. Accordingly, on the basis of the atmospheric pressure, the absolute pressure detected in each step of detecting the leakage reference differential pressure and the leakage differential pressure is compensated, so that the leakage of the system can be accurately determined without depending on the altitude.

The detector 80 includes an orifice 82 instead of the check valve 40 shown in FIG. 1. The orifice 82 connects between the pressure chamber 26 and the atmosphere. Thus, the passage on the atmosphere side of the pressure chamber 26 is narrowed, so that the canister port 24 and the atmosphere port 25 are disconnected by displacing the diaphragm 22 in accordance with pressure increase of the pressure chamber 26 when the pump 30 sucks from the first inlet/outlet port 31 and discharges to the second inlet/outlet port 32.

Since the detector 80 includes the orifice 82 instead of the check valve 40, the number of the parts of the detector 80 is reduced.

In the first to third embodiments, by reversing the rotation direction of the motor 34, suction and discharge of the air are switched between the first and the second inlet/outlet ports 31, 32. Accordingly, the diaphragm 22 is displaced in accordance with the differential pressure between the pressure of the canister port 24 connecting to the first inlet/outlet port 31 and the pressure of the pressure chamber 26 connecting to the second inlet/outlet port 32. Thus, the canister port 24 and the atmosphere port 25 are disconnected.

Thus, by using the differential pressure, the diaphragm 22 is displaced so that the detector 10, 70, 80 includes the diaphragm 22 as a mechanical differential pressure valve for connecting and disconnecting between the fuel tank side and the atmosphere side. Accordingly, the electric power consumption in the detector 10, 70, 80 becomes lower, compared with a construction having an electromagnetic valve for connecting and disconnecting between a fuel tank side and an atmosphere side. Thus, even when a battery is deteriorated, or even when electric power supply from the battery is reduced in a case where the battery and the system are cooled, the detector 10, 70, 80 can be operated so that the leakage test is performed sufficiently. Further, since the differential pressure valve has a simple construction, compared with the electromagnetic valve, the weight and the dimensions of the evaporated fuel leak detector 10, 70, 80 are reduced.

Fourth Embodiment

FIGS. 7A to 12 show an evaporated fuel leak detector 120 according to a fourth embodiment of the present invention. In the detector 120, a canister port 140 in a canister passage 200 and an atmosphere port 142 on the atmosphere side are connected and disconnected by a differential pressure valve 130. The canister passage 200 is connected to the canister 102.

The differential pressure valve 130 includes a diaphragm 132, a valve member 134, a spring 136, a pressure chamber 138, a canister port 140 as a tank port, an atmosphere port 142 opened to the atmosphere, and a detection port 144. The diaphragm 132 together with the valve member 134 is displaced integrally so that they provide a valve member. The spring 136 springs the diaphragm 132 toward the detection port 144. The diaphragm 132 separates the pressure chamber 138. The valve member 134 together with the diaphragm 132 is displaceable so that the detection port 144 or the atmosphere port 142 is closed in accordance with a position of the valve member 132, respectively. When the detection port 144 is closed, the canister port 140 and the atmosphere port 142 are connected. When the atmosphere port 142 is closed, the canister port 140 and the detection port 144 are connected. When an engine of an automotive vehicle runs, the differential pressure valve 130 is in a state shown in FIG. 7 so that the canister port 140 and the atmosphere port 142 are connected. Further, the pressure chamber 138 is connected to a pressure passage 220, and the detection port 144 connects to a detection passage 222. A reference orifice 210 is formed to penetrate a wall of a passage other than the detection passage 222, or formed to divide the detection passage 222.

A pump 150 is driven by a motor 154 so that the pump 150 sucks from an intake port 152. The ECU 60 operates the motor 154 to rotate in a direction for sucking the air from the intake port 152. An electromagnetic valve 160 switches a connection between the intake port 152 and the pressure passage 220 and a connection between the intake port 152 and the detection passage 222 by using displacement of the valve member 162. When a coil 166 is not energized, the valve member 162 of the electromagnetic valve 160 is disposed in a position shown in FIG. 7B according to spring force of the spring 164. Thus, the pressure passage 220 is closed. In this case, the intake port 152 and the detection passage 222 are connected. The absolute pressure sensor 72 detects the pressure of the detection passage 222 between the intake port 152 and the detection port 144 when the intake port 152 and the detection passage 222 are connected.

Next, the operation of the leak detector 120 is explained as follows.

(1) Normal Step

The normal step is performed in a case where the engine runs. When the engine runs normally, electricity is not supplied to the motor 154. The differential pressure valve 130 is in a state shown in FIG. 7. Electricity is not supplied to the purge valve 106 so that the purge valve 106 is closed. Accordingly, the canister side as a fuel tank side is connected to the atmosphere side through the differential pressure valve 130. Further, the canister, i.e., the inside of the canister 102, is disconnected to the intake pipe 104. As a result, the evaporated fuel generated in the fuel tank 100 is adsorbed to the canister 102 through the passage 110.

When the purge valve 106 is closed in a case where the system is in the state shown in FIG. 7, the intake pipe side of the canister 102 is connected to the atmosphere side through the passage 112, the canister passage 200 and the differential pressure valve 130. Thus, the evaporated fuel adsorbed in the canister 102 is discharged to the intake pipe 104 by using fresh air from the atmosphere port 142 generated by negative pressure in the intake pipe 104.

(2) Detecting Step for Detecting Leakage Reference Differential Pressure

Figure 8A:
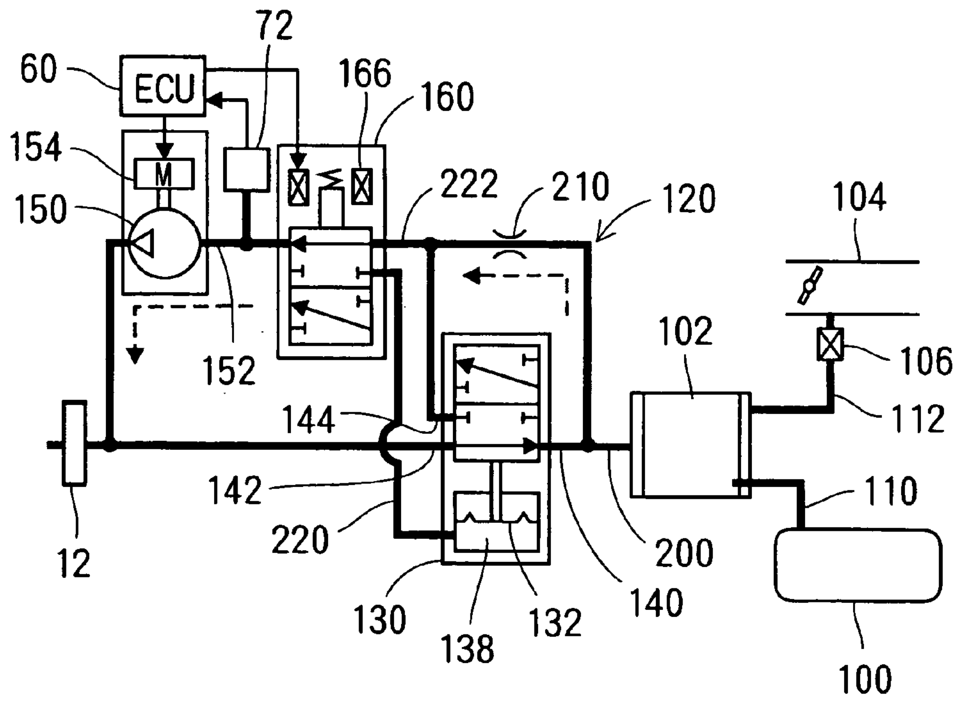
FIGS. 8A and 8B are schematic views of the processing system and the detector explaining a step of detecting a leakage reference pressure, according to the fourth embodiment.
Figure 8B:
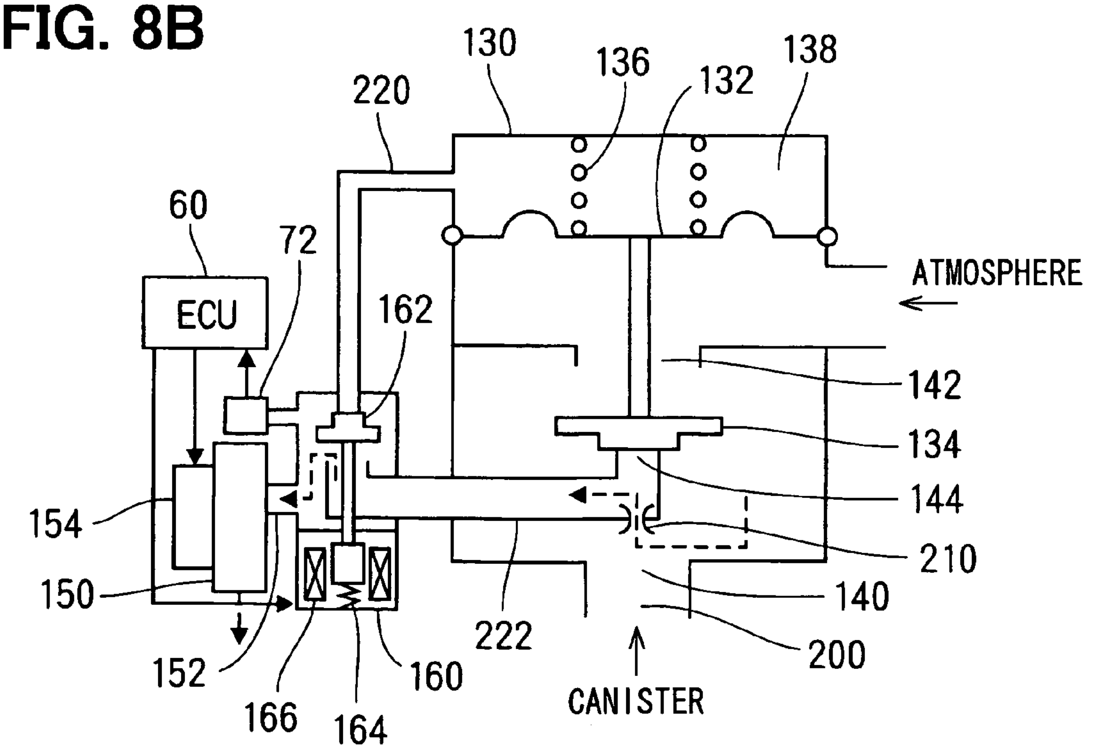
Figure 11:
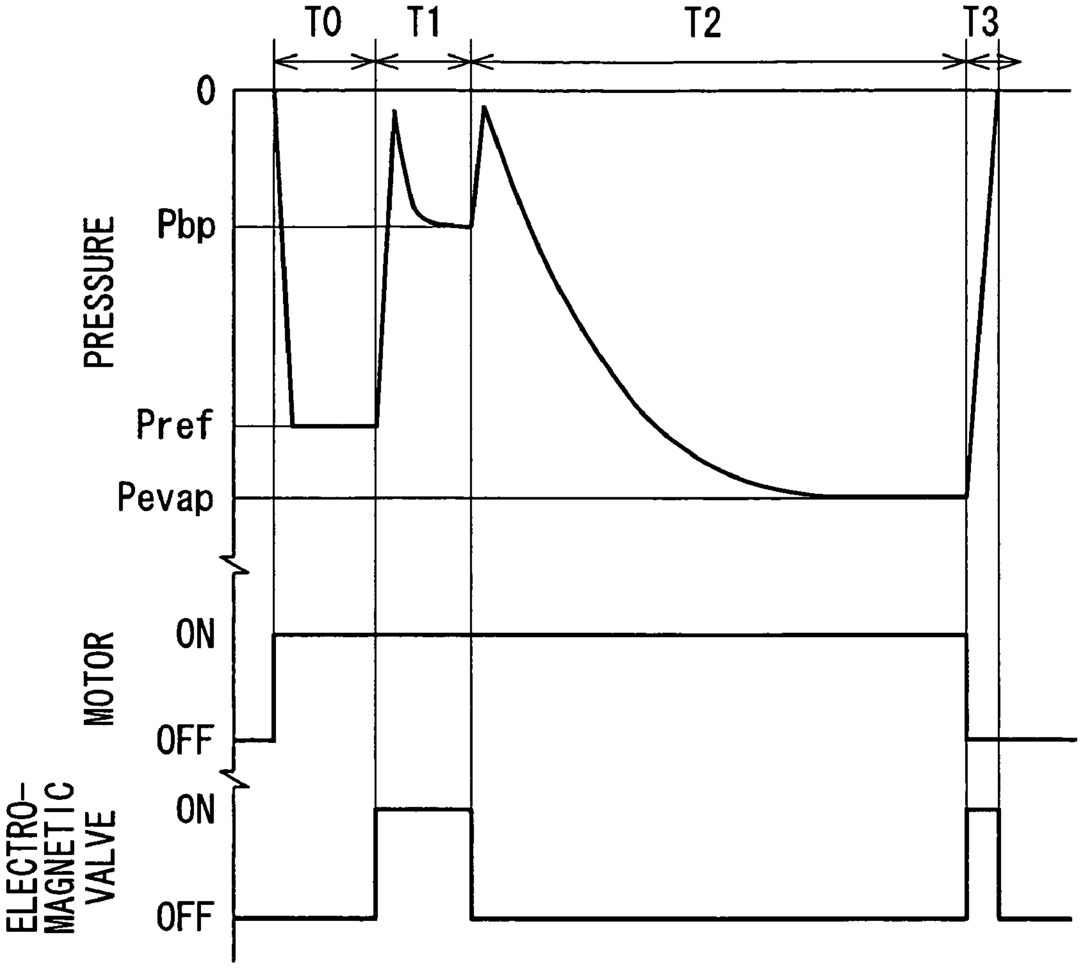
FIG. 11 is a graph showing a relationship among pressure, energization to a motor and energization to an electromagnetic valve in the steps of detecting the leakage reference pressure and the leakage pressure, according to the fourth embodiment.

This detecting step is performed in a case where the engine stops. As shown in FIG. 8, when the leakage reference differential pressure is detected by using the reference orifice 210, energization to the purge valve 106 is stopped so that the purge valve 106 is closed. As shown in FIG. 11, the ECU 60 operates the motor 154 so that the motor 154 is energized to rotate the pump 30. The coil 166 in the electromagnetic valve 160 is not energized. Accordingly, the pressure passage 220 and the intake port 152 are connected, and the intake port 152 connects to the detection passage 222. As a result, the atmosphere port 142 is opened by using the valve member 134, and the detection port 144 is closed by the valve member 134.

When the pump 150 works in a state shown in FIG. 8, the pump 150 sucks only the air passing through the reference orifice 210 from the intake port 152. Thus, the pressure in the detection passage 222 is reduced, as shown in FIG. 11. The state shown in FIG. 8 is the same as a state in that the system includes a hole having the same cross section as the reference orifice 210.

When the pressure in the detection passage 222 becomes constant during a measurement time T0 for measuring the leakage reference pressure, the ECU 60 memorizes an absolute pressure as a leakage reference pressure Pref on the basis of the pressure signal outputted from the absolute pressure sensor 72, the absolute pressure being in a case where the pump 150 sucks through the reference orifice 210. The pressure signal outputted from the absolute pressure sensor 72 in the step of detecting the leakage reference pressure corresponds to the pressure signal outputted from the absolute pressure sensor 72 in a case where the hole having the same cross section as the reference orifice 210 is opened in the evaporated fuel processing system and where the pump 150 sucks the air from the evaporated fuel processing system side so that the leakage test is performed.

(3) Operating Step for Operating the Differential Pressure Valve

Figure 9A:
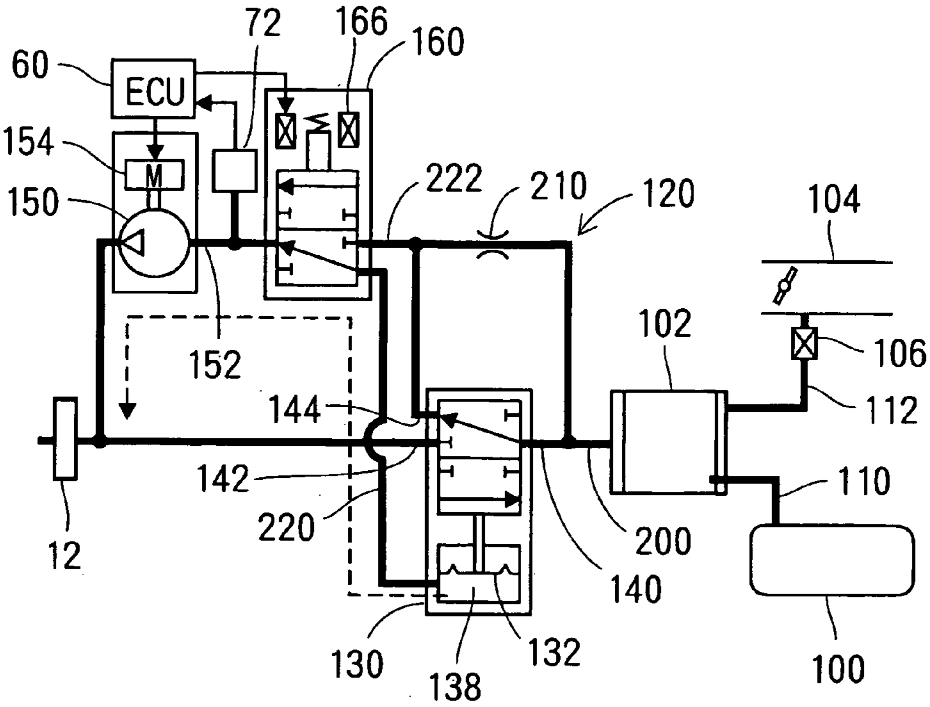
FIGS. 9A and 9B are schematic views of the processing system and the detector explaining a step of operating a differential pressure valve, according to the fourth embodiment.
Figure 9B:
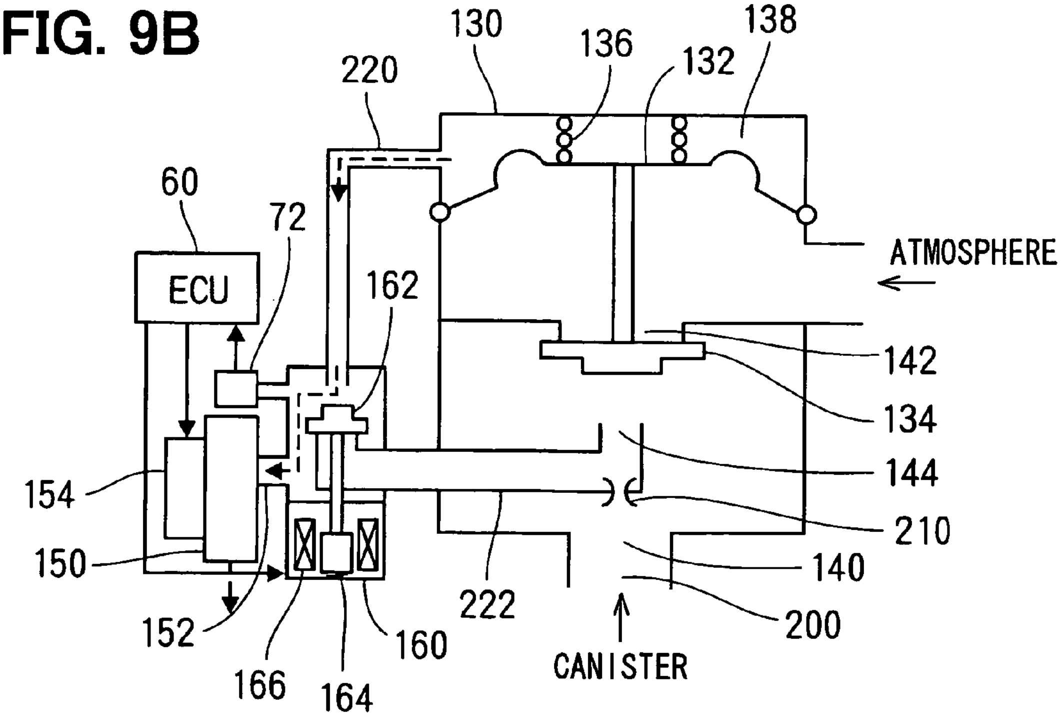

This operating step is performed in a case where the engine stops. When the leakage pressure in the system is detected, the purge valve 106 is closed. As shown in FIG. 11, the coil 166 of the electromagnetic valve 160 is energized. Then, as shown in FIG. 9, the force of the coil 166 becomes larger than the spring force of the spring 164 so that the valve member 162 is displaced to a direction for closing the detection passage 222. Before the valve member 162 of the electromagnetic valve 160 closes the detection passage 222, both of the pressure passage 220 and the detection passage 222 are opened. During this period, the pressure around the absolute pressure sensor 72 increases up to the atmospheric pressure. Then, as shown in FIG. 9, after the valve member 162 closes the pressure passage 220, and opens the detection passage 222, the intake port 152 and the detection passage 222 are disconnected, and the intake port 152 and the pressure passage 220 are connected. Therefore, the air in the pressure chamber 138, which has been sealed, is sucked from the intake port 152. Thus, the pressure of the pressure chamber 138 is reduced to a predetermined pressure Pbp, as shown in FIG. 11. Then, the diaphragm 132 and the valve member 134 are displaced from a position shown in FIG. 8 to a position shown in FIG. 9 by using the differential pressure between the pressure chamber 138 and the detection port 144. Thus, the atmosphere port 142 is closed, and the detection port 144 is opened, so that the canister port 140 and the atmosphere port 142 are disconnected, and the canister port 140 and the detection port 144 are connected.

(4) Detecting Step for Detecting Leakage Pressure

Figure 10A:
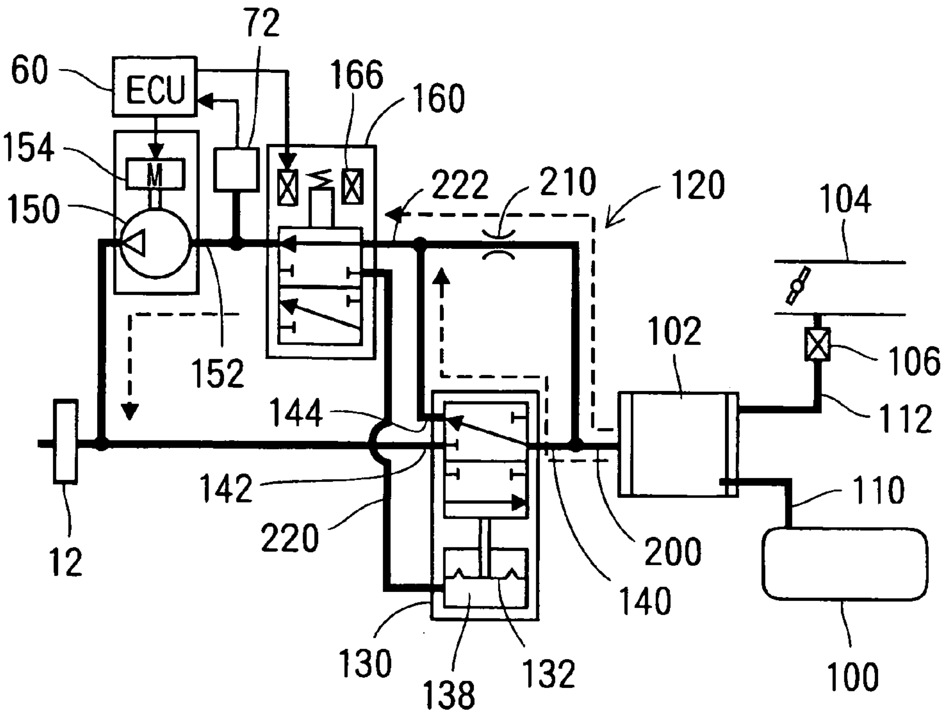
FIGS. 10A and 10B are schematic views of the processing system and the detector explaining a step of detecting a leakage pressure, according to the fourth embodiment.
Figure 10B:
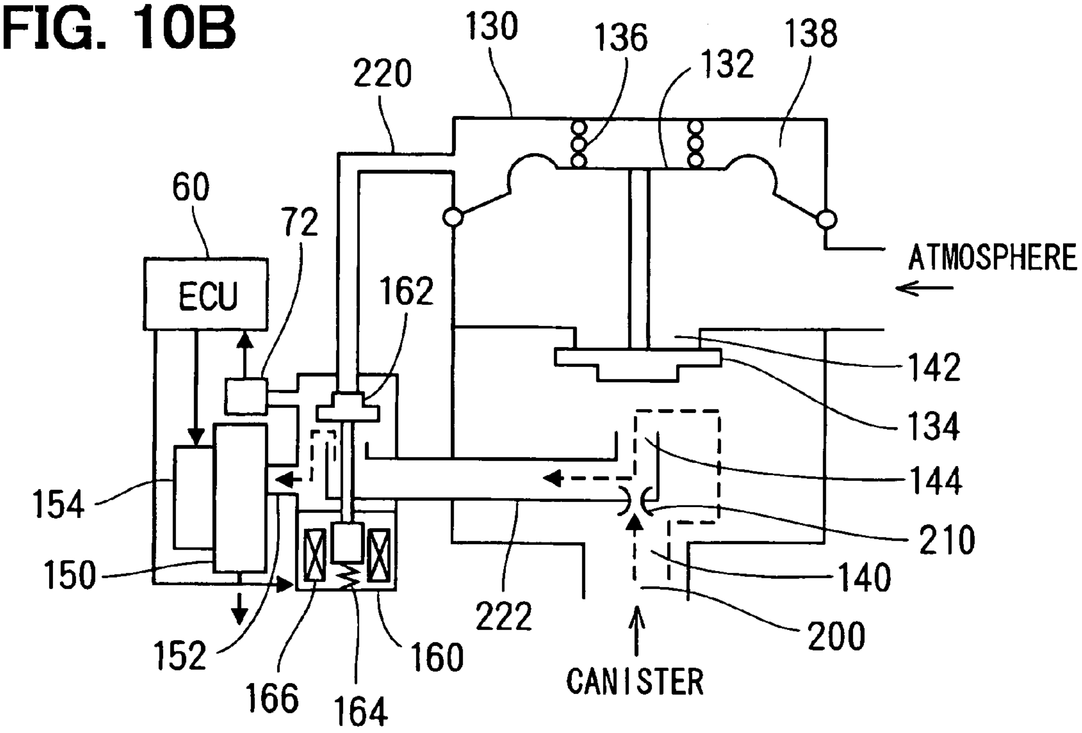

This detecting step is performed in a case where the engine stops. The coil 166 of the electromagnetic valve 160 is energized during a predetermined period T1 so that the differential pressure valve 130 becomes a state shown in FIG. 9. Then, the energization of the coil 166 is stopped. As shown in FIG. 10, the valve member 162 is displaced by the spring force of the spring 164 so that the pressure passage 220 is closed, and the detection passage 222 is opened. Thus, the intake port 152 and the pressure passage 220 are disconnected, and the intake port 152 and the detection passage 222 are connected. Since the pressure passage 220 is closed, the pressure of the pressure chamber 138 maintains to be negative. Thus, the valve member 134 of the differential pressure valve 130 maintains to be disposed on the same position shown in FIG. 9.

The intake port 152 and the detection passage 222 are connected, and the detection port 144 and the canister port 140 are connected. Thus, the pump 150 sucks the air from the canister side. In this case, the pump 150 sucks the air from the intake port 152 so that the evaporated fuel processing system side is depressurized. After a predetermined period T2 passes, the pressure of the evaporated fuel processing system side becomes to be a predetermined pressure Pevap by depressurizing with the pump 150 through the intake port 152. When leakage from a hole opened in the system is large, the pressure Pevap becomes higher, i.e., the pressure Pevap becomes to be closer to the atmospheric pressure. When the leakage from the hole opened in the system is small, the pressure Pevap becomes lower, i.e., the pressure Pevap becomes to be further to the atmospheric pressure.

The absolute pressure sensor 72 detects the pressure of the processing system side, i.e., the detection passage side, which is sucked with the pump 150, so that the sensor 72 outputs the pressure signal to the ECU 60. The ECU 60 compares the leakage reference pressure Pref detected in the step (2) of detecting the leakage reference pressure and the leakage pressure Pevap detected in the step (4) of detecting the leakage pressure. When the leakage pressure Pevap is lower than the leakage reference pressure Pref, i.e., when the leakage pressure Pevap is further from the atmospheric pressure than the leakage reference pressure Pref, the leakage on the processing system is smaller than the reference leakage. On the other hand, when the leakage pressure Pevap is higher than the leakage reference pressure Pref, i.e., when the leakage pressure Pevap is closer to the atmospheric pressure than the leakage reference pressure Pref, the leakage on the processing system is larger than the reference leakage.

Thus, by comparing the pressure detected in the step (2) in a case where the hole having the same cross section as the reference orifice 210 is opened and the pressure detected in the step (4), it is determined whether the leakage exists in the processing system or not, and the dimensions of the hole when the hole is opened in the system.

(5) Post Step

As shown in FIG. 11, after the predetermined period T2 as a measurement period passes, the leakage pressure Pevap becomes constant. Or when the leakage pressure Pevap becomes further from the atmospheric pressure by a predetermined value than the leakage reference pressure Pref, the energization of the motor 154 is stopped. Then, the energization of the electromagnetic valve 160 starts. Specifically, the electromagnetic valve 160 is energized during a predetermined period T3. In this case, since the pressure passage 220 is opened, the air flows into the pressure chamber 138 having the negative pressure through a clearance of the pump 150, which is stopped. Thus, the pressure of the pressure chamber 138 is increased up to the atmospheric pressure. Thus, the differential pressure valve 130 returns to the state shown in FIG. 8. The energization of the electromagnetic valve 160 is stopped after the predetermined time T3 passes.

Figure 12:
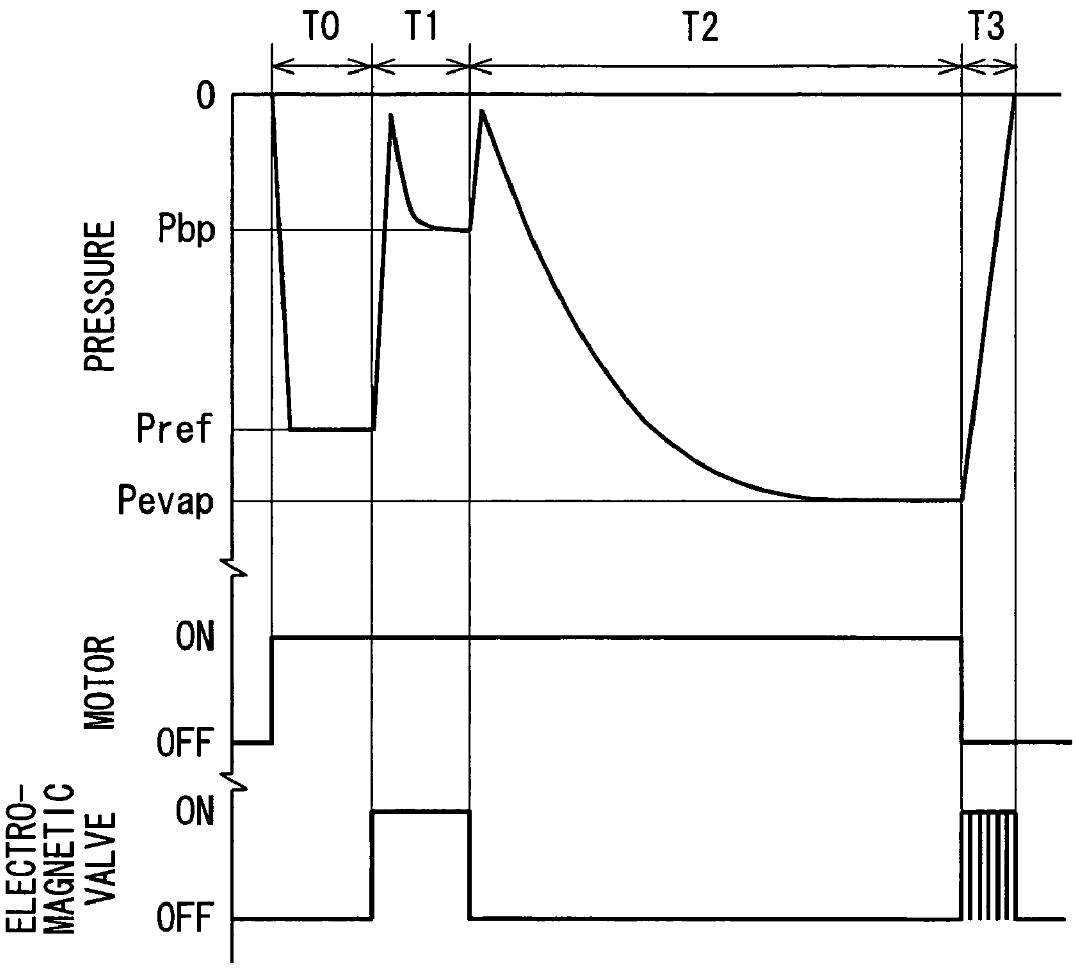
FIG. 12 is a graph showing a relationship among pressure, energization to a motor and energization to an electromagnetic valve in the steps of detecting the leakage reference pressure and the leakage pressure, according to the fourth embodiment.

Here, for example, if the pump 150 has excellent sealing performance such as a diaphragm, the pressure of the pressure chamber 138 may not be increased up to the atmospheric pressure even when the pressure passage 220 is opened to the atmosphere during the predetermined period T3. Here, during the predetermined period T3, the energization of the motor 154 is stopped, and the energization of the electromagnetic valve 160 turns on, so that the pressure passage 220 is opened. In this case, as shown in FIG. 12, after the step (4) of detecting the leakage pressure, the energization of the electromagnetic valve 160 repeats to turn on and off during the predetermined period T3. When the electromagnetic valve 160 repeats to turn on and off, the valve member 162 is displaced backward and forward so that the pressure passage 220 and the detection passage 222 are connected. Therefore, the pressure of the pressure chamber 138 can be increased up to the atmospheric pressure.

In this embodiment, the detector 120 includes a differential pressure valve having the diaphragm 132 mechanically displaceable in accordance with the differential pressure so that the connection between the detection port 144 and the canister port 140 and the connection between the atmosphere port 142 and the canister port 140 are switched each other. Therefore, the electric power consumption of the detector 120 becomes smaller than a detector having an electromagnetic valve for switching the connections. Accordingly, the detector 120 can operate to detect the leakage of the system, even when a battery is deteriorated, or even when electric power supply performance from the battery becomes lower. Here, since the temperature of the battery is low, the electric power supply performance from the battery becomes lower. Further, the differential pressure valve having the diaphragm 132 has simple construction and light weight, compared with an electromagnetic valve. Therefore, the detector 120 can be manufactured to have reduction in size and weight.

Further, switching between the connection between the intake port 152 of the pump 150 and the pressure passage 220 and the connection between the intake port 152 and the detection passage 222 is switching of the pump 150 between sucking from the pressure passage 220 and sucking from the detection passage 222. Therefore, a small sized electromagnetic valve 160 can be used for switching. Accordingly, even when the small sized electromagnetic valve 160 is used, the electric power consumption of the processing system is reduced.

Further, since the pump 150 only sucks from the intake port 152, and the electromagnetic valve 160 switches the sucking passage of the pump 150, no check valve is necessitated in the detector 120. Accordingly, since the sucking power of the pump 150 is not used for operating the check valve, the leakage reference pressure and the leakage pressure are accurately detected.

Although the detector 120 includes the absolute pressure sensor 72, the detector 120 may includes the differential pressure sensor 14. Further, the pressure in the system may be detected on the basis of characteristics such as rotation speed of the motor 154 and current of the motor 154, which are in proportion to load, i.e., the pressure.

Fifth Embodiment

Figure 13:
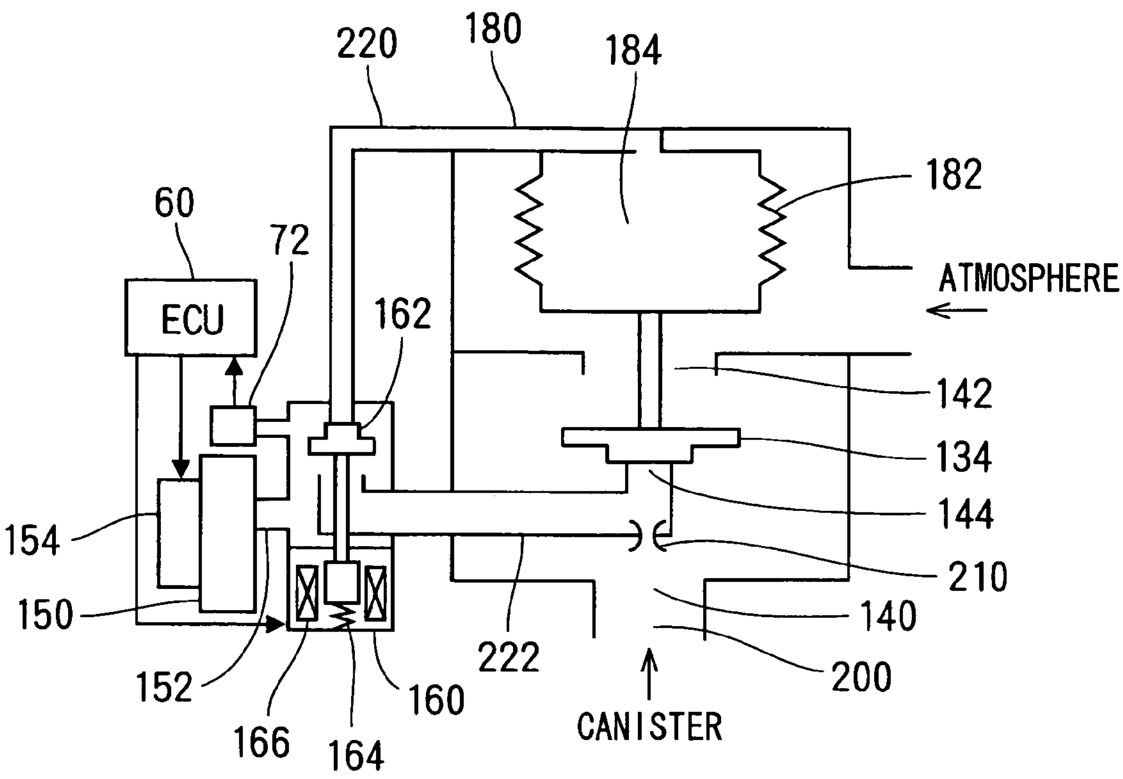
FIG. 13 is a schematic view showing an evaporated fuel leak detector according to a fifth embodiment of the present invention.

FIG. 13 shows a leak detector according to a fifth embodiment of the present invention. The detector includes a bellows as a differential pressure valve 180 instead of the diaphragm 132 shown in FIG. 7. A pressure chamber 184 of the differential pressure valve 180 is separated with the bellows 182. The elastic force of the bellows 182 pushes the valve member 134 to the detection port side.

(Modifications)

The detector 10, 70, 80, 120 includes the reference orifice 210 so that the leakage reference differential pressure and the leakage reference absolute pressure as the leakage reference pressure by sucking the air through the reference orifice 210. Alternatively, the detector without the reference orifice 210 may include the ECU 60 having memory of the leakage reference pressure, which is preliminarily detected and memorized in the ECU 60. The leakage of the processing system is determined by comparing the memorized leakage reference pressure and the actually detected leakage pressure of the system. In this case, in the first to third embodiments, to depressurizing the processing system side is only required, so that the motor may rotate only one way.

Although the detector includes the diaphragm 132 or the bellows 180 as a valve part of the differential pressure valve, other means may be used for the valve part of the differential pressure valve as long as the valve part is displaced in accordance with the differential pressure between the canister port 24 or the detection port 144 and the pressure chamber 138.

Although the leakage of the evaporated fuel processing system is detected, the detector may detect leakage of the evaporated fuel from a fuel tank, i.e., leakage of a fuel tank side, in which the evaporated fuel flows.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An evaporated fuel leak detector for detecting leakage of an evaporated fuel generated in a fuel tank, the detector comprising:

a differential pressure valve including a detection port, an atmosphere port, a pressure chamber and a valve member, wherein the detection port connects to a fuel tank side, wherein the atmosphere port is opened to atmosphere, wherein the valve member is displaceable in accordance with the differential pressure between the detection port and the pressure chamber for connecting and disconnecting a connection between the detection port and the atmosphere port, and wherein the valve member disconnects the detection port from the atmosphere port in a case where pressure of the pressure chamber becomes larger than pressure of the detection port by a predetermined pressure;

a pump for sucking a detection port side of the differential pressure valve so as to reduce pressure on a fuel tank side;

pressure detection means for detecting pressure on a detection port side of the differential pressure valve; and a reference orifice for generating a leakage reference pressure, wherein the pump includes a first inlet/outlet port connecting to the detection port and a second inlet/outlet port connecting to the pressure chamber, and wherein the pressure detection means is a differential pressure sensor for detecting differential pressure between a second inlet/outlet port side of the reference orifice and the detection port side of the differential pressure valve.

2. The detector according to claim 1, wherein the detector detects leakage of an evaporated fuel processing system, the system includes an adsorption chamber having adsorbent for adsorbing the evaporated fuel generated in the fuel tank, the system discharges the adsorbed evaporated fuel to an intake pipe, and the detection port is connected to the adsorption chamber.

3. The detector according to claim 1, further comprising:

a check valve, wherein the check valve allows to flow from the reference orifice to the second inlet/outlet port, and prohibits to flow from the second inlet/outlet port to the reference orifice, the pressure detection means further detects pressure on a second inlet/outlet port side of the reference orifice, and the pump switches between a state for sucking from the first inlet/outlet port and for discharging to the second inlet/outlet port and another state for sucking from the second inlet/outlet port and for discharging to the first inlet/outlet port so that the valve member is displaced.

4. The detector according to claim 3, further comprising:

a motor for driving the pump, wherein the motor is capable of switching a rotation direction backward and forward so that the pump switches between the state for sucking from the first inlet/outlet port and for discharging to the second inlet/outlet port and the other state for sucking from the second inlet/outlet port and for discharging to the first inlet/outlet port.

5. The detector according to claim 3, wherein the pressure detection means is a pair of absolute pressure sensors, one of which is disposed on a second inlet/ outlet port side of the reference orifice, and the other one of which is disposed on a detection port side of the differential pressure valve.

6. The detector according to claim 1, wherein the valve member includes a diaphragm.

7. The detector according to claim 1, further comprising: a motor for driving the pump, wherein the pump switches between a state for sucking from the first inlet/outlet port and for discharging to the second inlet/outlet port and another state for sucking from the second inlet/outlet port and for discharging to the first inlet/outlet port so that the valve member is displaced, the motor is capable of switching a rotation direction of backward and forward so that the pump switches between the state for sucking from the first inlet/outlet port and for discharging to the second inlet/outlet port and the other state for sucking from the second inlet/outlet port and for discharging to the first inlet/outlet port, when the motor rotates in a forward direction so that the pump sucks from the second inlet/outlet port and discharges to the first inlet/outlet port, the pump sucks air from the pressure chamber through the second inlet/outlet port so that the valve member connects between the detection port and the atmosphere port, and the pump discharges the air to the atmosphere through the first inlet/outlet port, the detection port and the atmosphere port, and when the motor rotates in a backward direction so that the pump sucks from the first inlet/outlet port and discharges to the second inlet/outlet port, the pump sucks from the fuel tank side through the first inlet/outlet port, and the pump discharges the air to the pressure chamber through the first inlet/outlet port.

8. The detector according to claim 7, further comprising: a check valve, wherein the second inlet/outlet port further connects to the atmosphere through the check valve and the reference orifice, the check valve allows to flow from the reference orifice to the second inlet/outlet port, and prohibits to flow from the second inlet/outlet port to the reference orifice, when the motor rotates in a forward direction so that the pump sucks from the second inlet/outlet port and discharges to the first inlet/outlet port, the pump sucks the air not only from the pressure chamber through the second inlet/outlet port but also from the atmosphere through the second inlet/outlet port, the check valve and the reference orifice, and when the motor rotates in a backward direction so that the pump sucks from the first inlet/outlet port and discharges to the second inlet/outlet port, the pump sucks the air from the fuel tank side through the first inlet/outlet port.

9. The detector according to claim 8, further comprising: an electric control unit, wherein when the motor rotates in the forward direction, the pressure detection means detects a differential pressure as a leakage reference differential pressure, when the motor rotates in the backward direction, the pressure detection means detects a differential pressure as a leakage differential pressure, the electric control unit determines that leakage of the fuel tank side is smaller than leakage from the reference orifice in a case where the leakage reference differential pressure is smaller than the leakage differential pressure, and the electric control unit determines that leakage of the fuel tank side is larger than leakage from the reference orifice in a case where the leakage reference differential pressure is larger than the leakage differential pressure.

10. The detector according to claim 8, further comprising: an electric control unit, wherein the pressure detection means is a pair of absolute pressure sensors, one of which is disposed on a second inlet/outlet port side of the reference orifice, and the other one of which is disposed on a detection port side of the differential pressure valve, when the motor rotates in the forward direction, the pressure detection means detects a difference of pressure between the second inlet/outlet port side of the reference orifice and the detection port side of the differential pressure valve as a leakage reference differential pressure, when the motor rotates in the backward direction, the pressure detection means detects a difference of pressure between the second inlet/outlet port side of the reference orifice and the detection port side of the differential pressure valve as a leakage differential pressure, the electric control unit determines that leakage of the fuel tank side is smaller than leakage from the reference orifice in a case where the leakage reference differential pressure is smaller than the leakage differential pressure, and the electric control unit determines that leakage of the fuel tank side is larger than leakage from the reference orifice in a case where the leakage reference differential pressure is larger than the leakage differential pressure.

* * * * *